(12) United States Patent
Doherty

(10) Patent No.: US 11,738,693 B2
(45) Date of Patent: Aug. 29, 2023

(54) COMBINATION BICYCLE AND CARGO RACK

(71) Applicant: Thomas Doherty, Tuckerton, NJ (US)

(72) Inventor: Thomas Doherty, Tuckerton, NJ (US)

(73) Assignee: Thomas Doherty, Tuckerton, NJ (US)

( * ) Notice: Subject to any disclaimer, the term of this patent is extended or adjusted under 35 U.S.C. 154(b) by 0 days.

(21) Appl. No.: 17/592,467

(22) Filed: Feb. 3, 2022

(65) Prior Publication Data

US 2022/0242330 A1 Aug. 4, 2022

Related U.S. Application Data

(60) Provisional application No. 63/199,939, filed on Feb. 4, 2021.

(51) Int. Cl.
*B60R 9/10* (2006.01)
*B60R 9/045* (2006.01)

(52) U.S. Cl.
CPC ............... *B60R 9/10* (2013.01); *B60R 9/045* (2013.01)

(58) Field of Classification Search
CPC ................................ B60R 9/10; B60R 9/042
USPC .......................................................... 224/924
See application file for complete search history.

(56) References Cited

U.S. PATENT DOCUMENTS

| | | | | |
|---|---|---|---|---|
| 4,046,273 | A * | 9/1977 | Hughes | B60P 3/1008 414/462 |
| 4,630,990 | A * | 12/1986 | Whiting | B60R 9/042 224/310 |
| 6,244,483 | B1 * | 6/2001 | McLemore | B60R 9/10 224/521 |
| 7,240,816 | B2 * | 7/2007 | Tsai | B60R 9/10 211/195 |
| 9,694,759 | B1 * | 7/2017 | VanAmburgh | B60R 9/08 |
| 2008/0230579 | A1 * | 9/2008 | Wang | B60R 9/10 224/400 |
| 2018/0361943 | A1 * | 12/2018 | Ellenbogen | B60R 9/042 |
| 2022/0185405 | A1 * | 6/2022 | Huang | B62H 3/12 |

FOREIGN PATENT DOCUMENTS

| | | | | |
|---|---|---|---|---|
| EP | 2540574 A1 * | 1/2013 | | B60R 9/06 |
| KR | 101881254 B1 * | 7/2018 | | |

* cited by examiner

*Primary Examiner* — Scott T McNurlen
(74) *Attorney, Agent, or Firm* — Gottlieb, Rackman & Reisman, P.C.

(57) ABSTRACT

A bicycle rack and a cargo rack are disclosed, which can operate together as a single unit. The rack articulates in a variety of ways such as to allow access to the vehicle while mounted with bicycles in the rear and to ease access to the roof for placement and removal of cargo.

15 Claims, 40 Drawing Sheets

COMBINATION BICYCLE AND CARGO RACK

This application claims priority to U.S. Provisional Patent Application No. 63/199,939, filed Feb. 4, 2021 and now pending, the entirety of which is incorporated by reference.

BACKGROUND OF THE PRESENT INVENTION

In general, there is an unmet need for a device which attaches to a vehicle, such as a car or a pickup truck, in a safe and convenient manner, which is able to be concurrently usable for transport of a plurality of bicycles in addition to other cargo on the exterior of a vehicle securely. Typically, one can find a bicycle rack, which may hold a plurality of bicycles, or a roof rack, or a hitch mount T-bar cargo carrier, which could hold one or more canoes or construction materials or the like but not as a single combined unit. Bicycle racks mounted on a vehicle tend to be mountable on the vehicle's roof or the rear of the vehicle. When mounted on the roof, it becomes an arduous task to access the bicycles for placement or removal and once placed, the bicycles impact vehicular fuel efficiency by causing enormous wind resistance.

Alternatively, one or more bicycles can be placed on a rack attached at the rear of the vehicle. The bicycles ride behind or more typically parallel to and/or elevated from the rear the vehicle. Although mounting and dismounting bicycles is easier in this configuration, there are issues with the bicycles contacting the vehicle during mounting, dismounting, and while in transit, potentially causing damage and obstructing view. Either way, it can be difficult to mount the rack and it is easy for a person mounting the rack to cause damage to the vehicle either during mounting or because of reduced visibility. It can also be a challenge to mount the bicycles. It would be beneficial for a rack itself which is easy to mount, does not require climbing or reaching the roof of a car, and can hold bicycles and other cargo concurrently with ease of placement. When there is a need to carry cargo, removal of the normally present hitch mount bike rack to install a hitch mount T-bar cargo carrier rack followed later by reinstall of the dedicated bike rack, represents an inordinate amount of extra difficulty and work. A combination bike & cargo hitch mount rack therefore is a great advantage.

Bicycle racks tend to allow bicycles to be mounted by the bicycle frame alone. While generally secure, this method allows wheels to spin and also creates additional unnecessary wind resistance. In addition, once the bicycle rack is mounted on the rear of the vehicle, the rack and its bicycles become fixed in position and for many bike rack models, access to the interior of the vehicle through the rear such as through a hatch or trunk vanishes unless the bicycles are first removed or a form of gymnastics is performed. To access the vehicle interior easily one must use other vehicle doors or dismount the bicycles. It would be beneficial to allow such access when the vehicle is carrying bicycles alone or for the combination of bicycles and roof cargo.

Further, bicycle racks tend to mount by being attached to multiple portions of a vehicle, such as rain gutters, one or more doors, or one or more windows concurrently. Also, mounting bicycles on racks tends to be an awkward or arduous process whereby the person mounting needs to be extra careful to avoid scratching the bicycle or the vehicle. It would be beneficial to have an easy and safe approach to bicycles mounting on and dismounting from a rack.

Roof racks themselves have many problems, particularly when mounting on a high roof, such as on an SUV. A user may need to use a ladder to access the roof, and may have to balance loads for placement on the roof while on the ladder.

Further, it is always a challenge to place or remove heavier cargo from a roof. It would be beneficial to overcome this obstacle as well by formulating a rack which eases access and loading efforts.

Even mounting either a bicycle rack or a roof rack alone tends to be an arduous process and each often requires multiple points of connection and contact. By using the hitch as a sole point of connection, securing the device to the vehicle is assured and access does not require climbing onto the vehicle or a ladder.

BRIEF DESCRIPTION OF THE PRESENT INVENTION

The present invention is directed to a combined bicycle rack and roof cargo holder for a vehicle, such as a sport utility vehicle, car, minivan, or pickup truck, where the cargo is securely held over and/or past the vehicle, the present invention is configured to carry a plurality of mounted bicycles in addition to roof cargo, such as but not limited to one or more canoes, kayaks, boats, skis, construction materials, luggage and/or the like with articulation for easing placement and removal. The mounting portion of the present invention preferably leverages use of a vehicle hitch.

The present invention allows human access to the rear of the vehicle even while the vehicle has bicycles and potentially other cargo mounted. Further, the device of the present invention is articulatable to both provide access to the interior of the vehicle while the bicycles are on the vehicle, and is also articulatable to provide fulcrum-like and rotatable angular access to ease placing of or removing roof cargo.

There are at least two primary points of articulation in the present invention. The first allows the bulk of the device with its payload to move away from the rear hatch of the vehicle so that the rear hatch can be opened and a user can have direct access to the interior of the vehicle from its rear without removal of bicycles from the rack or removal of the rack itself. The second point of articulation is related to an upper horizontal beam, which is used at least for supporting roof cargo, but also angles away from the vehicle and rotates to allow easier loading and secure of cargo on the roof. This beam's height is also adjustable and it can be used in a variety of ways for further securing cargo above it or otherwise on it. These points of articulation can be engaged separately or together.

DETAILED DESCRIPTION OF THE PRESENT INVENTION

Figure 1:
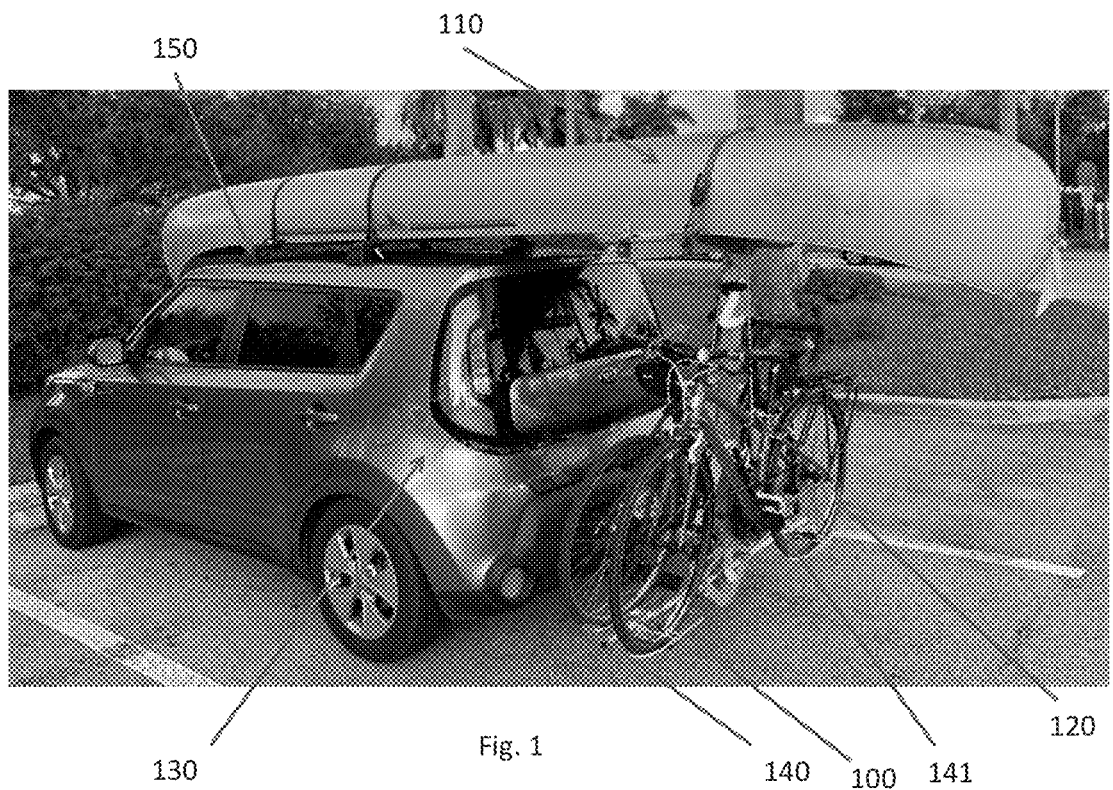
FIG. 1 depicts the device of the present invention attached to a vehicle and carrying two bicycles and roof cargo.

The present invention is directed to a combination bicycle and cargo rack ("device") for a vehicle. The device of the present invention has numerous benefits over the prior art including being alignable, and at least in part being self-aligning, in that the device is adjustable to both the vehicle being used, to various bicycle frame shapes and frame tube angles and at least the device's position on the vehicle depending on whether the vehicle door is open or closed, as well as adjusting to ease cargo placement on or removal from a roof. That is, the horizontal and vertical positioning of some or all of the device may change, either on its own or with user control, based on whether the vehicle's rear hatch is open or closed, and the device may articulate in whole or in part. The function of enabling easy bicycle and roof cargo load onto a vehicle for transport together via such articulations provide benefits previously unattainable. The device of the present invention, in part because it articulates, allows for access to the interior of the rear of the vehicle even when the device is attached to the vehicle, and even when bicycles are attached to the device. These articulation benefits are achieved, at least in part, via selectable pinning and clamping arrangements on the device, where the pin(s) when inserted or clamps when tightened using knobs (as an example), keep the device and its contents locked in its horizontal/vertical position and orientation, and when removed allows the device to "float" with the opening of the vehicle's rear hatch and to articulate in part to improve roof access. See FIG. 4. The adjustment can be for some or all portions of the device. Further, some or all of the cargo rack portion of the present invention is separately rotatable and/or rearrangeable from the remainder of the device, or may be adjusted so as not to be rotatable. In addition, the cargo rack of the present invention affords loading accessibility to the roof in a novel way.

A goal of the present invention is to provide a combined bicycle and cargo roof load and carry rack for a vehicle.

Another goal of the present invention is a combined bicycle and cargo rack which is easily mounted on a vehicle.

Another goal of the present invention is to provide a combined bicycle and cargo rack where mounting bicycles is easily achieved with less effort than typical.

Another goal of the present invention is to provide a combined bicycle and cargo rack where mounting cargo on the roof is easily achieved with much less effort than typical.

Another goal of the present invention is to provide a device whereby the cargo, including bicycles, is easily secured, potentially without undue or any bicycle wheel movement.

Another goal of the present invention is to provide a combined bicycle and cargo rack whereby access to the rear interior of the vehicle remains available while bicycles are stored on the rack.

Another goal of the present invention is to provide articulation and pivoting of the combined rack as needed to ease access to placing and removing cargo on the roof.

Another goal of the present invention is to have a low weight combined bicycle and roof rack.

Another goal of the present invention is to have a support beam for supporting roof cargo, where the beam can include means for tying down or securing cargo without first having to place the cargo in position on the roof.

Another goal of the present invention is to have a bicycle rack which attaches to a vehicle via an onboard hitch.

Another goal of the present invention is to have a self aligning bicycle hold down feature that is strong and secures the bicycle yet minimizes or eliminates harm to the surface finish of various angled bicycle frame tube structures of various bicycle designs.

Another goal of the present invention is to have a device for carrying bicycles which can leverage existing roof racks.

The core portion of the device of the present invention includes two horizontal beams 250, 310 connected at their lengthwise centers to a vertical beam 220. The lower horizontal beam and vertical beam together are used for additional reasons including support for one or more bicycles and the upper horizontal beam is usable for reasons including supporting cargo riding above the device, including at least in part on the vehicle's roof. The device of the present invention includes an extension portion for allowing improved access for placing or removing roof cargo, such as but not limited to a canoe, a kayak, another boat, construction materials, or skis, to the roof of the vehicle, thereby forming an angle and acting as a rotatable open shaft to enable easier lifting of various cargo onto the roof.

In one embodiment, upper horizontal beam 310 has holes 315 punched which can be used for securely tying down cargo.

With reference to FIG. 1-4, the device of the present invention attaches to a vehicle with opening 430 accepting hitch 260 and securing the device to the hitch assembly.

The cargo holder portion of the present invention ("cargo rack") further includes a rotatable and articulatable portion, potentially rotatable to move to a drop down position, forming an effective angle (preferably acute) with its original position, to allow a person to access the cargo rack portion of the device or to the vehicle's roof for storage and removal of cargo while the person's feet remain on the ground thereby allowing the device to easily rotate to afford access to the car roof. The portion can additionally rotate to allow the cargo to be placed on the vehicle roof. Rotation can be anywhere from 90 to 180 or more degrees as needed. That is, this portion can articulate, rotate, or both. Consequently, the user need not use a ladder for access to the roof storage. In one embodiment, the upper horizontal bar 310 can rotate, thereby creating a rotatable cargo holder. The rotating cargo holder is configured at least (1) to provide adequate support past the rear of the vehicle for maintaining cargo in place on the vehicle's roof and (2) to provide an improvement in access to storage and removal of cargo from the vehicle's roof. That is, cargo like a canoe can have one end placed on the rotating holder and with the other end of the cargo initially being on the ground, with the first end of the cargo being secured to the rack, the cargo can be lifted and rotated up and over the vehicle for further securing on the roof. By enabling lift of just one end of the cargo at a time, the felt weight of the object is cut by approximately 50% and lifting may be eased by further leveraging the upper horizontal beam of the present invention.

In addition, the upper horizontal beam of the present invention can be used in conjunction with a common roof rack or can be used for roof cargo without a roof rack in that the cargo can be tied down to the vehicle itself in addition to being secured to the upper horizontal beam.

While in one embodiment the cargo rack portion may be limited to a single horizontal beam (of the two in the core) and potentially a perpendicular section, the perpendicular section potentially being a portion or the entirety of a vertical beam, the cargo rack portion can be extended to include additional elements which are securable to the vehicle roof, such as but not limited to rails, platforms, or additional horizontal elements separately securable, such as to rain gutters, windows, and the like. When such extra elements are included, they may be detachable from the remainder of the device.

The device of the present invention primarily is intended to connect to a vehicle primarily or exclusively using a hitch extending from the lower rear portion of the vehicle. The connection to the hitch of the car is usable as one of the points of support and the connection to the hitch is one of the points of articulation of the device.

FIG. 1 depicts an exemplary version of the device of the present invention attached to an SUV-type vehicle and carrying two bicycles 140 and 141[1] and a canoe 110 on the roof. As shown, the device carries up to two bicycles but may be extendible to include additional bicycles or by using an additional adaptor structure for such things as fishing gear or wheelchairs, which can also or alternatively be conveniently carried. That is, the bicycle-carrying portion of the present invention is adaptable, such as by adding in additional elements or replacing additional elements with elements more suitable to carrying such things as fishing gear, skis, ski equipment, wheelchairs, or the like.

[1] While discussed herein as bicycles, other elements such as motorcycles or other wheeled or non-wheeled elements can be carried in addition or in the alternative.

The device of the present invention is configured to carry the bicycles behind the vehicle, instead of the bicycles being attached to a device attached to a window, door frame, or rain gutters of the vehicle, and the bicycles travel while resting in a generally vertical plane. As shown, the bicycles are carried so as to be vertically positioned and arranged to face 90 degrees from the direction of the vehicle. As shown, the bicycles are configured to have the same orientation as each other but need not have the same orientation and, in the configuration shown, can be mounted in opposite direction to one another.

Importantly, when bicycles (or wheelchairs, etc.) are included, they ride within the device's frame, such as is shown in FIG. 1. Within the device of the present invention the bicycles are configured to ride behind the vehicle without touching the vehicle either during mounting or while in transit. By not touching the vehicle, issues of other bicycle racks, such as scratching of the vehicle or window cracking caused by the carried bicycles are avoided.

A base beam structure 290 is included in the present invention and has a critical role of holding typically four bushings (more or less as needed may be included, or other known support structures may be used) in line to enable strong support (hold things well in position but also reduce side to side flexing of the vertical beam and all attached), and allows for easy rotation of horizontal beam 250 and attached wheel trays/loops.

Figure 2:
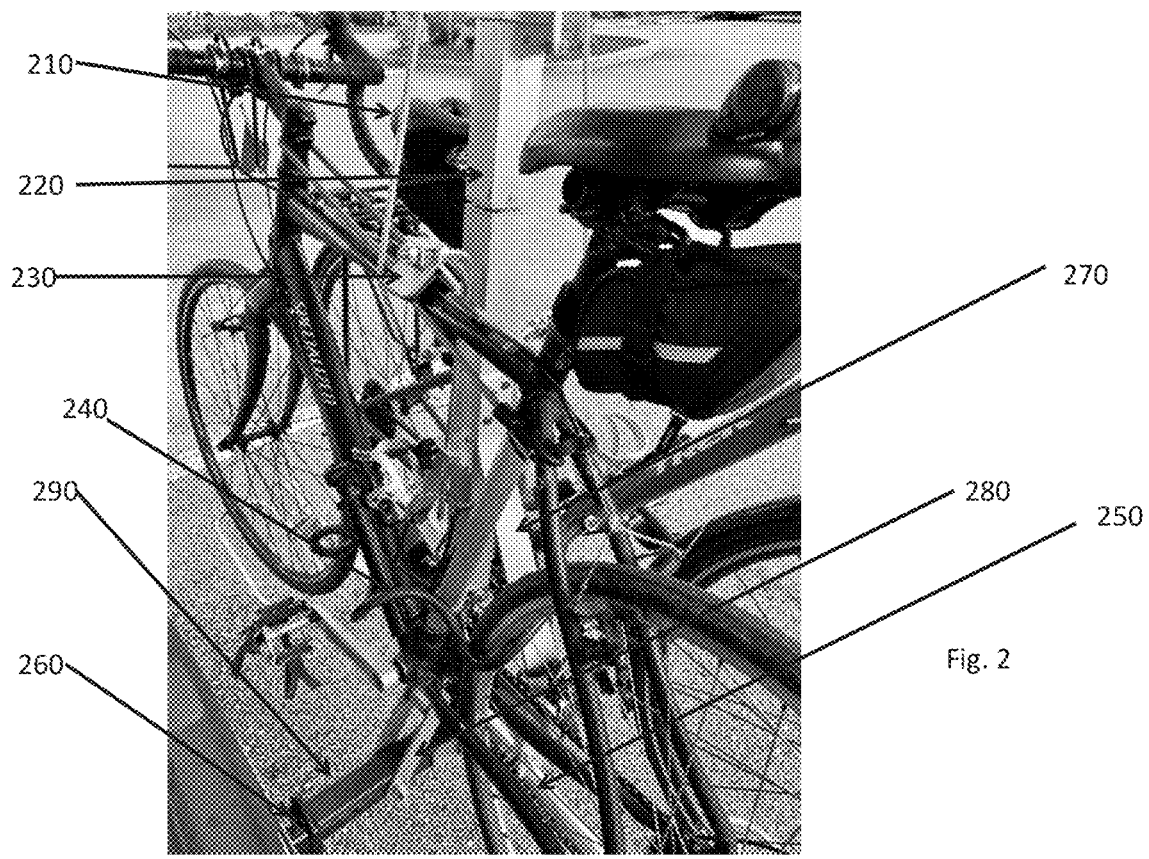
FIG. 2 depicts the bicycle carrier portion of the device of the present invention including two bicycles attached to the device.

As can be seen in FIG. 2, the core portion of the device is preferably formed of a steel, titanium, composite, and/or aluminum frame in the general shape of a 90 degree rotated letter "H", with two horizontal beams separated by a vertical beam or portion. The lower horizontal beam 250 of the rotated H is formed of a metal, preferably steel, aluminum or titanium, which is intended to provide strong structural support for the assembly with bicycles. The lower horizontal beam 250, typically round in cross section (but as with other beams, alternate shapes may be used in the alternative), is attachable through, for example, bushings distributed within base beam structure 290 to a vehicle hitch 260. Circular cross section is preferred as this beam can be rolled on its axis, as described below, for access to the rear interior of the vehicle. In general, the cross-section is uniformly structured.

The vertical beam or portion 220, preferably square in cross section, which is preferably formed of light yet strong aluminum or composite materials, extends upwardly from the horizontal portion at about the lower horizontal portion's center. In general, the cross-section is uniformly structured. In some embodiments, pin arrangements are used for easing access, rotating, articulating, and/or securing the device and/or its cargo. The vertical beam may be formed of other suitable materials in the alternative, such as but not limited to titanium and steel. This vertical beam has additional functions—it can be extended or contracted by pieces nesting within other piece or by removing sections, so it itself can be adjusted easily, such as to conform to the height of an existing roof rack, and its position can be locked in place, such as through pinning. It can articulate, such as having a section near the top which can pivot toward and/or away from the vehicle. Lower horizontal beam 250 and vertical beam 220 together are defined as the "bicycle holding" functional element. Similarly, the entirety of the vertical beam can pivot from either or both of the upper horizontal beam 310 or lower horizontal beam 250. This full pivot affords the opportunity to use some or all of the bike holding portion of the device as a slide surface for raising and/or lowering storage elements from the roof without having to awkwardly lift items to the roof. When articulating or pivoting, or returning elements to place, the elements include various pinning arrangements.

Figure 3:
FIG. 3 depicts the device of the present invention with roof cargo and without bicycle cargo.
Figure 16:
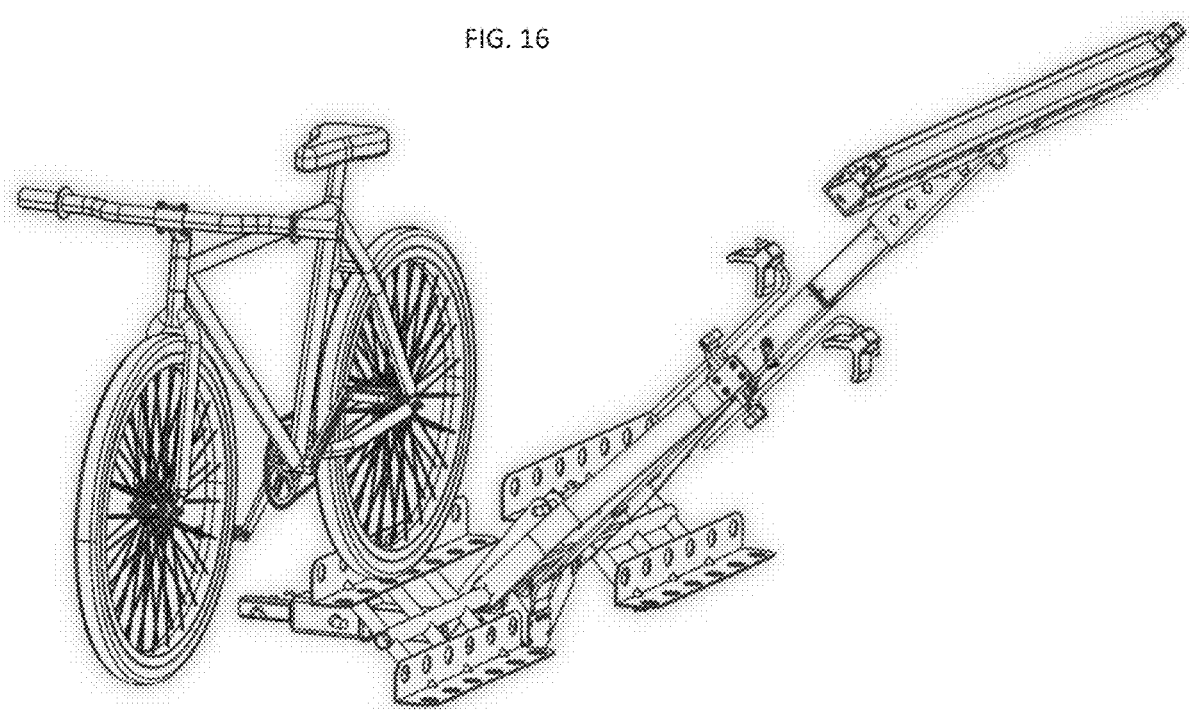
FIGS. 16-19 depict one embodiment of the present invention and a sequence of how a bicycle may be loaded and secured to the rack portion of the invention nearest the vehicle.
Figure 17:
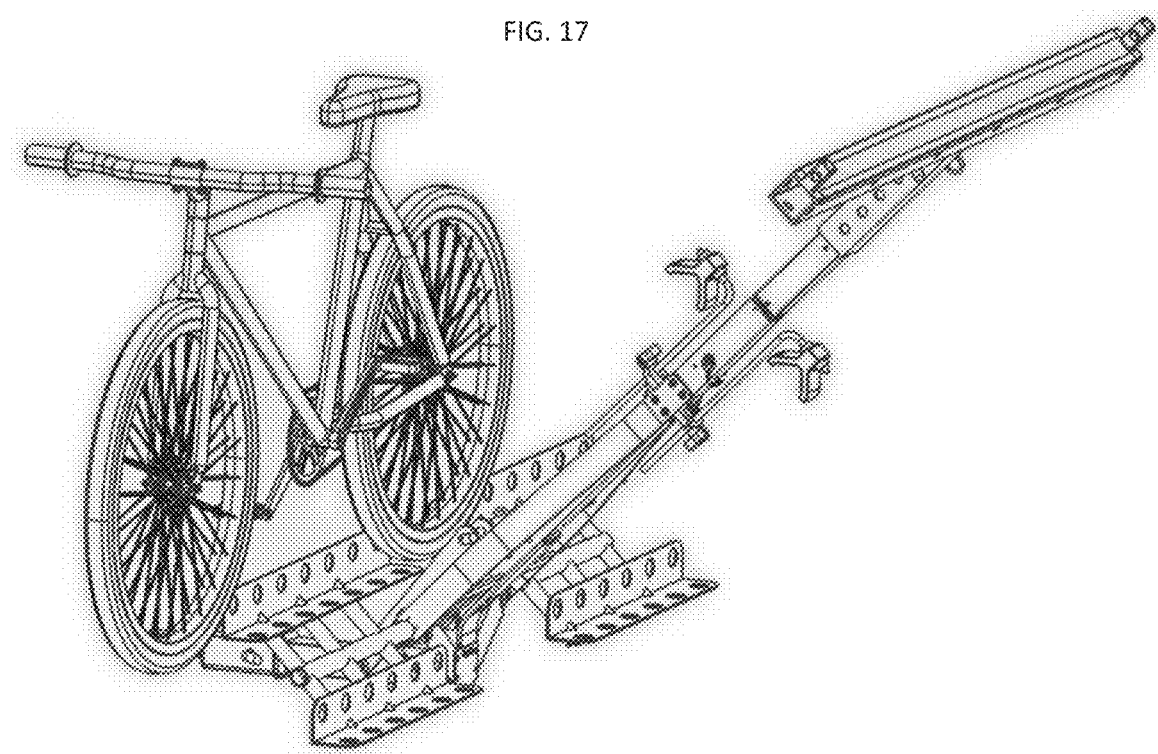
Figure 18:
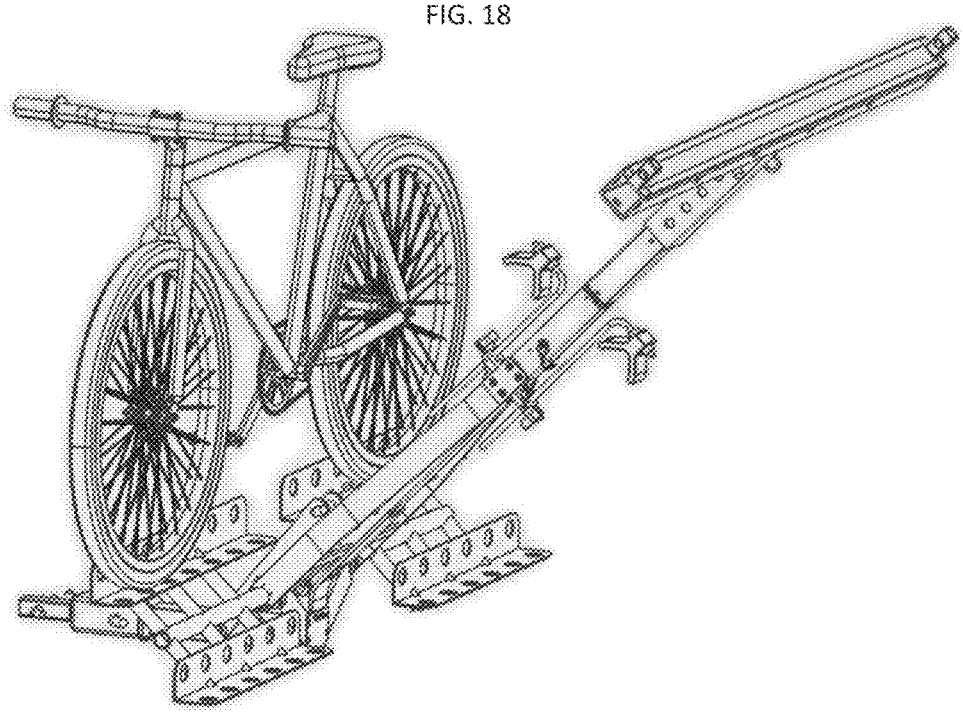
Figure 19:
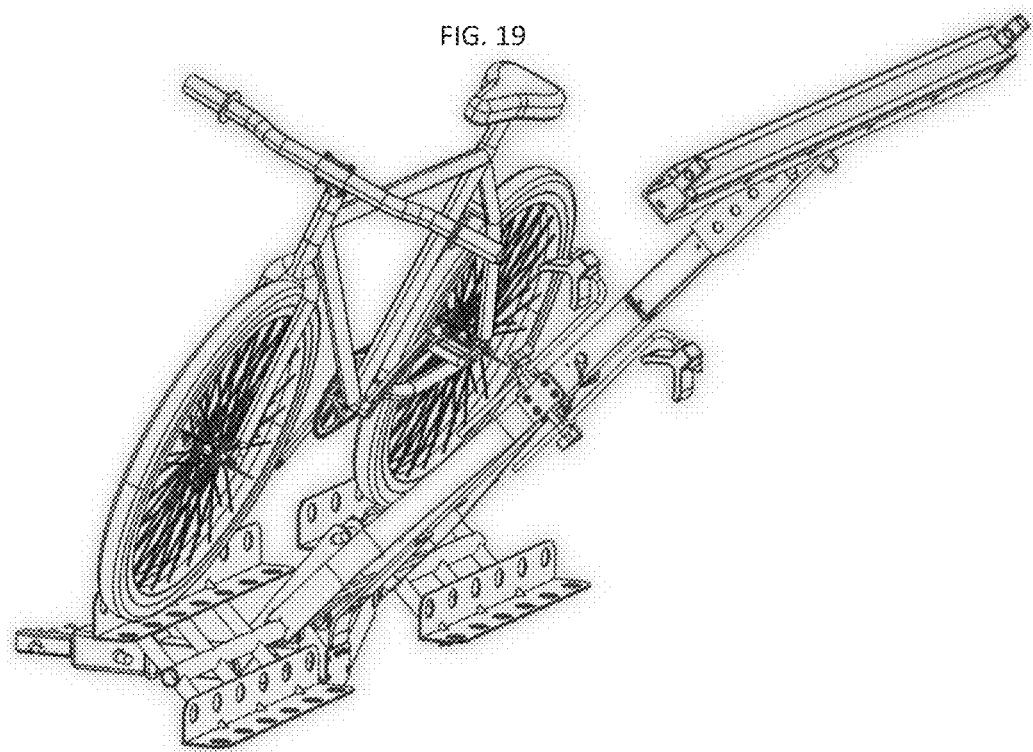
Figure 20:
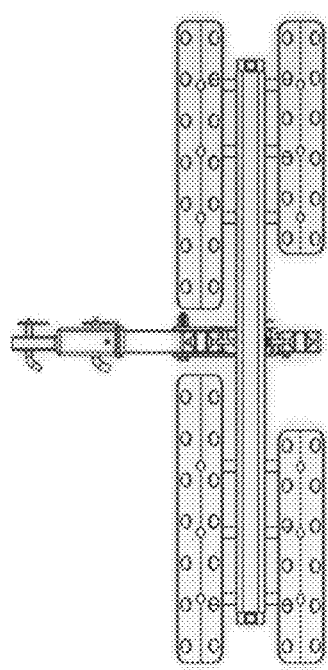
FIGS. 20-22 depict various perspective views of the device of the present invention.
Figure 21:
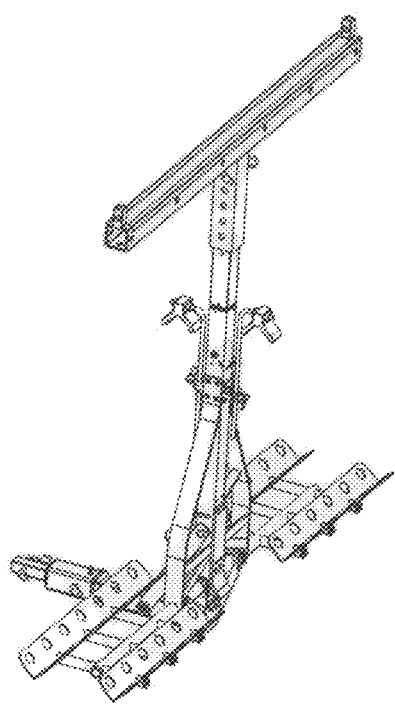
Figure 22:
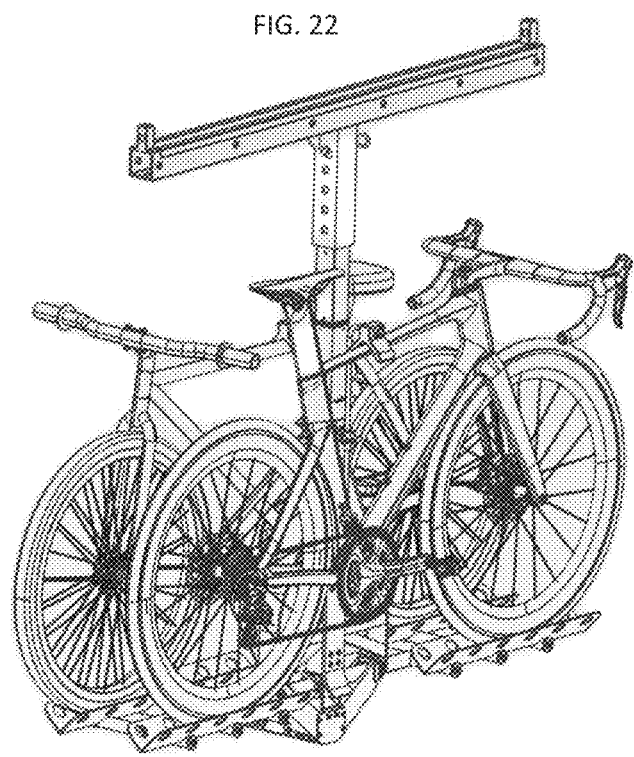
Figure 23:
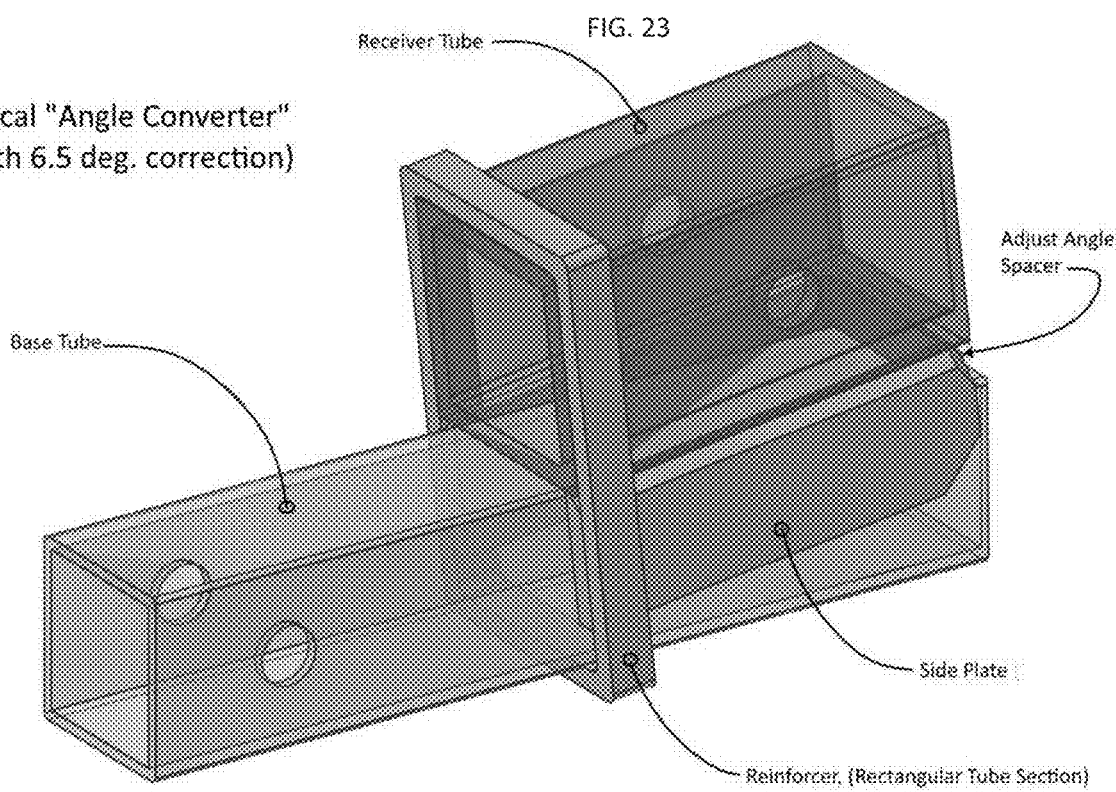
FIG. 23 depicts one embodiment of a hitch angle converter device for angular correction of hitches installed with large angle departures from the desired level angle.
Figure 24:
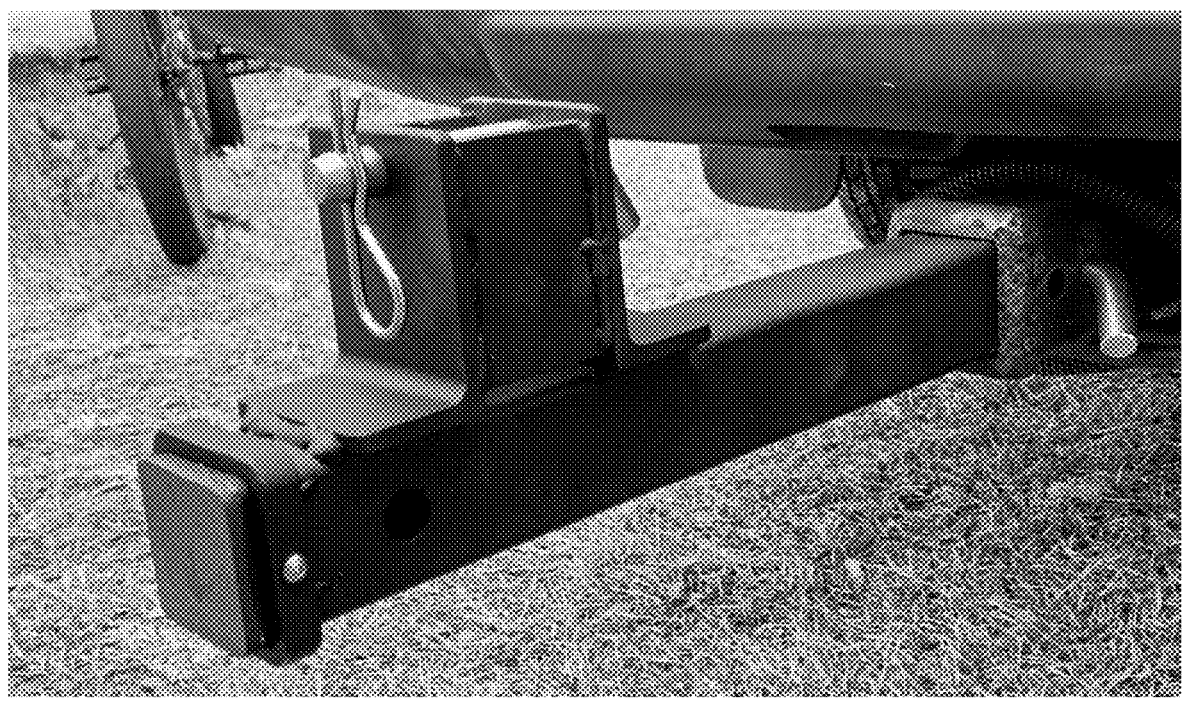
FIGS. 24-26 depict an adjustable angle trike rack add-on made viable by the hitch angle converter with a link remove fold up feature.
Figure 25:
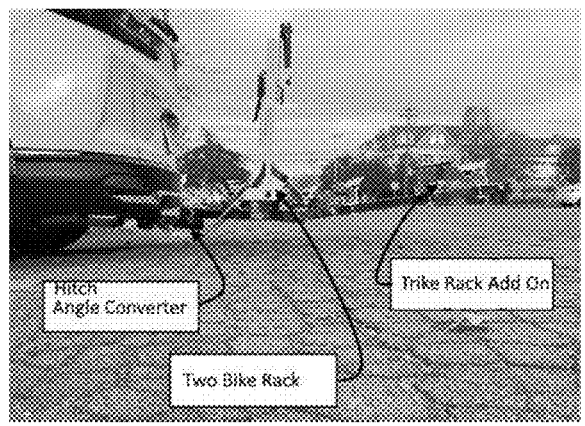
Figure 26:
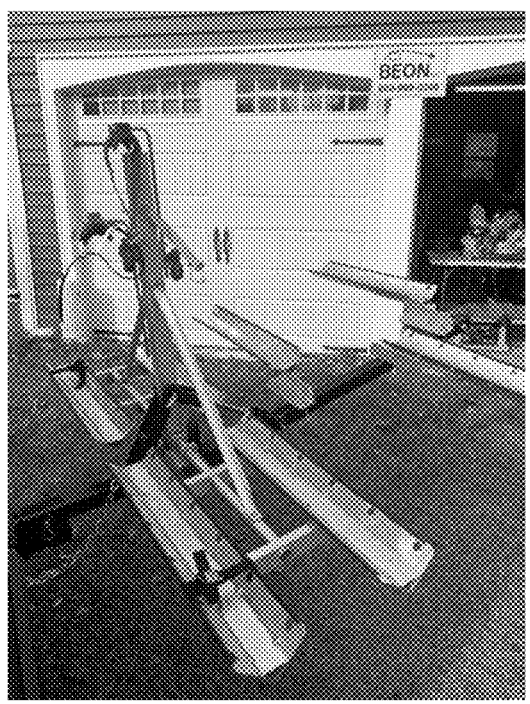

With reference to FIGS. 1-3, loops 100 extend from the lower horizontal beam 250 of device and rest in a generally horizontal plane. These loops are used to secure the bicycle wheels in position. While shown in FIGS. 1-3 as loops, alternate embodiments, such as one shown in FIGS. 16-18 described as "wheel trays" as an example, could include platforms with one or more flanges for centering, supporting and seating a wheel of a bicycle and usable to position the bicycle for locking in place. The flange in this embodiment may be on one side or a plurality of sides of the platform and may differ by side of the device or and/or front to back. While discussed below as a "loop", the reader should understand that the term encompasses the various embodiments, including the wheel tray platform embodiment, discussed herein and others known in the art.

Each wheel of each bicycle is intended to seat into one loop of a paired set of loops 100 (one loop for a front wheel, one loop for a back wheel) so that some of each wheel 120 sits below the plane of the loops. By securing the wheels in the loops, the wheels are precluded from rotating while being driven by the vehicle.[2] Each pair of loops may be in a different plane such as to accommodate handlebars being in different planes. The loops, which are adjustable each of vertically and laterally (that is, distance relative to one another), sit in a horizontal plane which itself may be adjustable up or down. The loops are attached to the overall frame of the device and extend outwardly from the lower horizontal beam of the device of the present invention. When a bicycle is seated in the loops as described herein.

[2] While shown in FIG. 1 with bungee cords securing the wheels, there are merely optional. The lower horizontal beam may include a connection point for these bungee cords.

When configured for wheelchairs and/or the like, the device is similarly adjustable.

Figure 12:
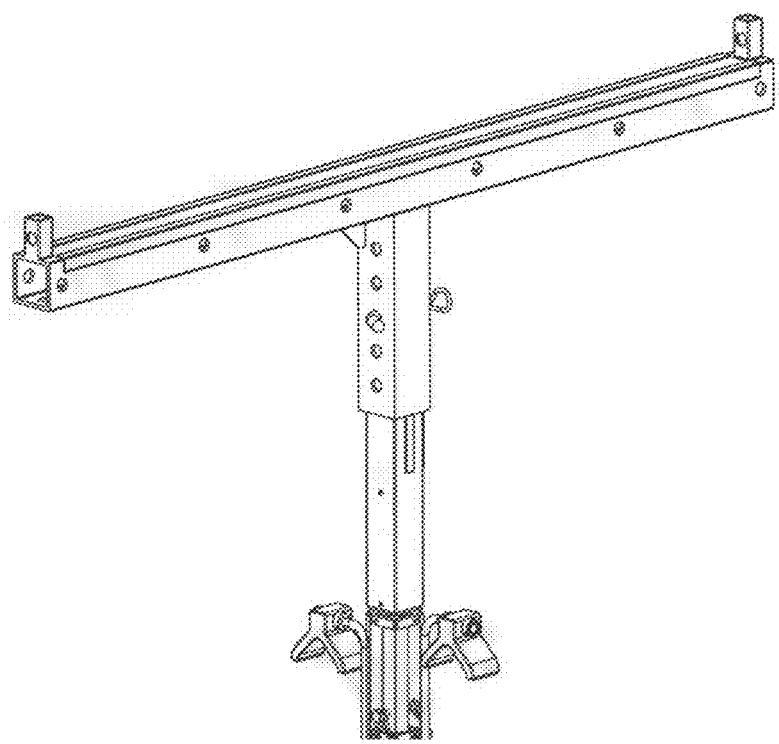
Figure 13:
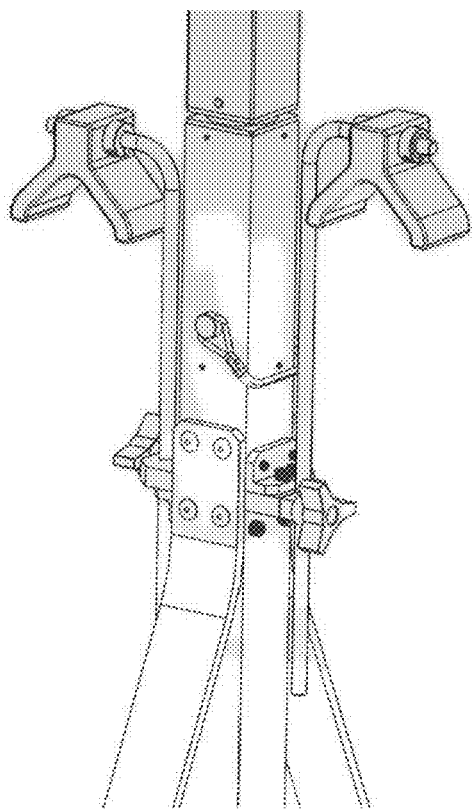
Figure 14:
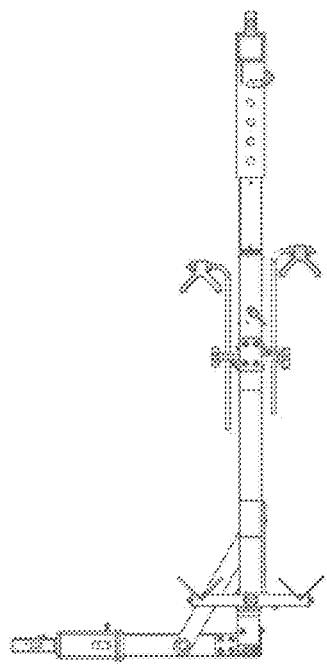
Figure 15:
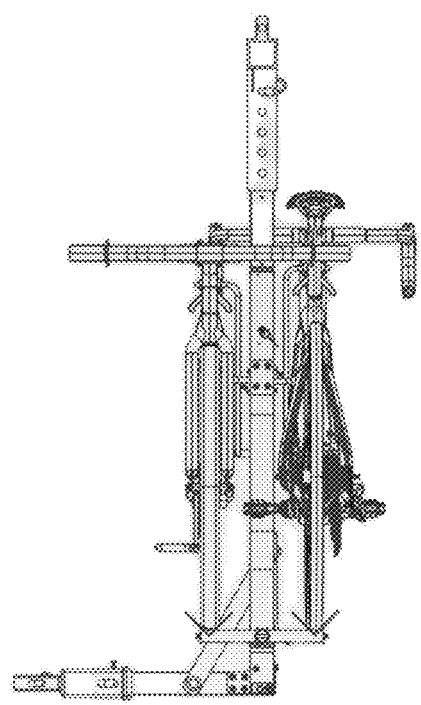

Each bicycle is positionally non-mobile when secured, and one or more frame supports ("hold downs") are further used to lock the bicycle in place using a clamping block closed by a clamping knob threaded fastener or other secure means. See FIG. 2, elements 240 and 230. In some embodiments, only one of these may be used or needed. In addition, element 230, one per bicycle, may be adjustable. See FIG. 12 for an example of adjustability. As can be seen in FIG. 12, element 230 may be V shaped and sit over a cross bar of the bicycle and held down with a tightening pin. In some embodiments, these hold downs may be self-aligning in that they can align to each different bicycle frame tube angles independently while being adjusted downward vertically to securely attach the bike for driving. During driving, this secure self aligned hold down method is intended to secure the bicycles without them bouncing up or down to leave their loop wheel supports (from shock loads such as when driving into a pothole). Hold down 230 can be operated by a user to clamp down, lock, or otherwise secure a bicycle. The bike hold downs themselves are intended to encompass or encircle one or more structural elements of the bicycle and potentially a portion of each wheel of the bicycle. While bungee cords 210 can be used to attach the bike to the frame, bungee cords 210 are not necessary in the present invention but provide added assurance.

By seating the bicycles in the loops, one can angularly lower or raise the device to enable raising the rear hatch of the vehicle without unseating the bicycles.

As can be seen in FIGS. 1-3, the bicycle rack portion of the device sits generally behind the vehicle, is preferably only attached to the vehicle via hitch 260, and holds bicycles 140, 141, as examples. Mounting each bicycle is easy in that the bicycle's wheels are placed in loops 100 and then secured with the securing elements of the present invention.

In some embodiments, the device of the present invention may include further elements. Struts 270 are fixed side diagonal elements used to provide both additional structure stiffness to the device and to keep the two bicycles in position and avoid contacting one another. Cross link pieces 280 are also helpful for providing structure and strength to the device and are used as inflection points for releasing the lower horizontal beam and its attached vertical beam from their normally vertical orientation so as, for example, to enable easier access to the vehicle interior thru the rear hatch by articulation of these components with bicycles loaded.

Figure 4:
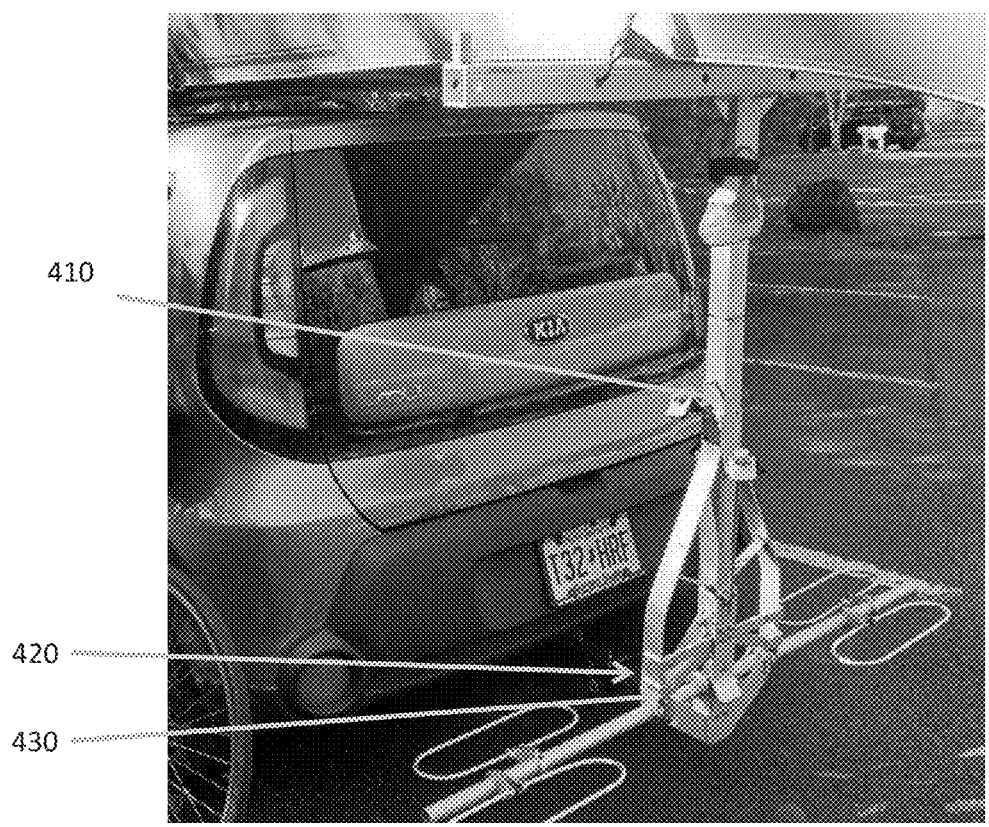
FIG. 4 depicts an expanded view of the photograph of FIG. 3, expanded to show points of articulation.
Figure 5:
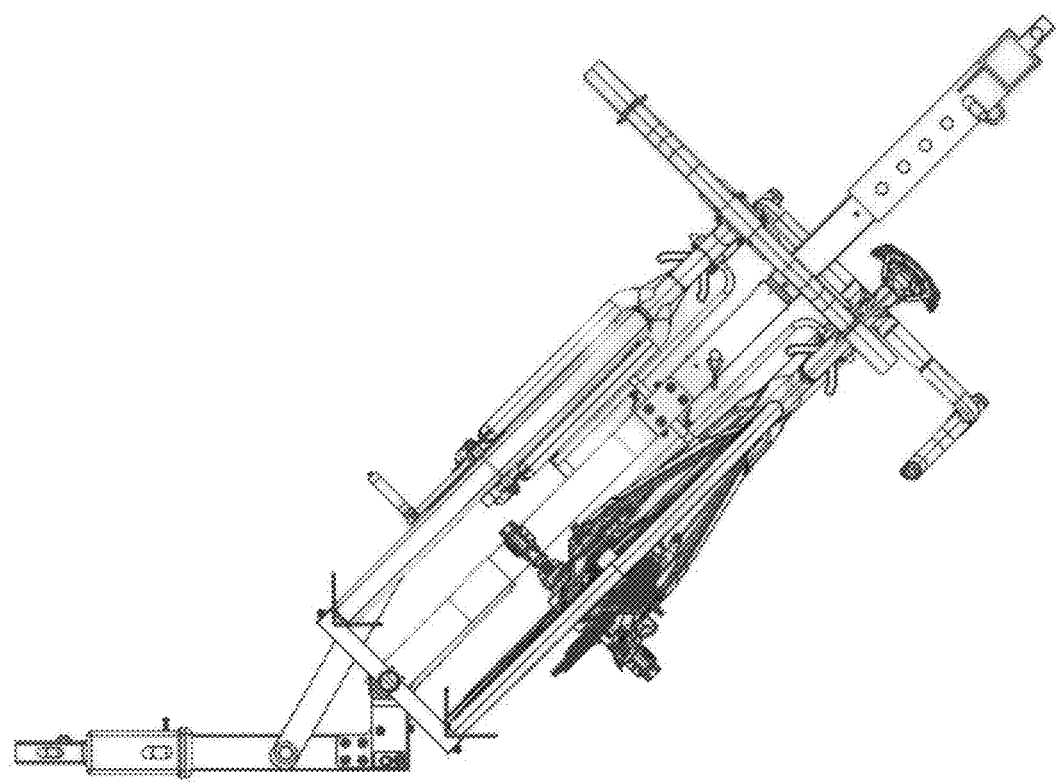
FIGS. 5-6 depict the device of the present invention articulated to allow access to the rear door of the vehicle with the door open.
Figure 6:
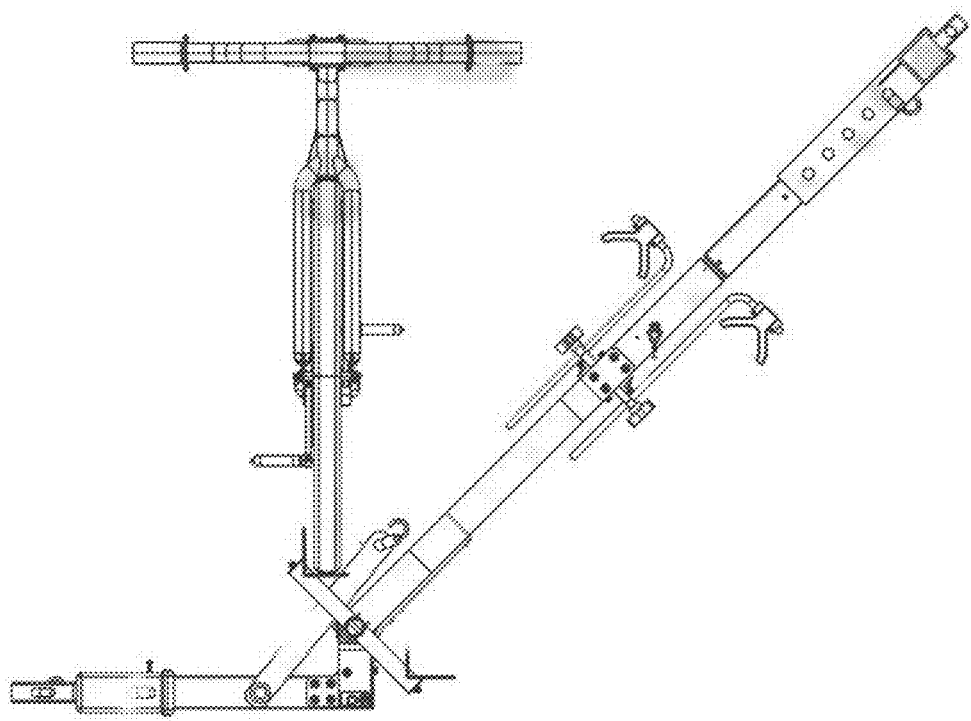
Figure 7:
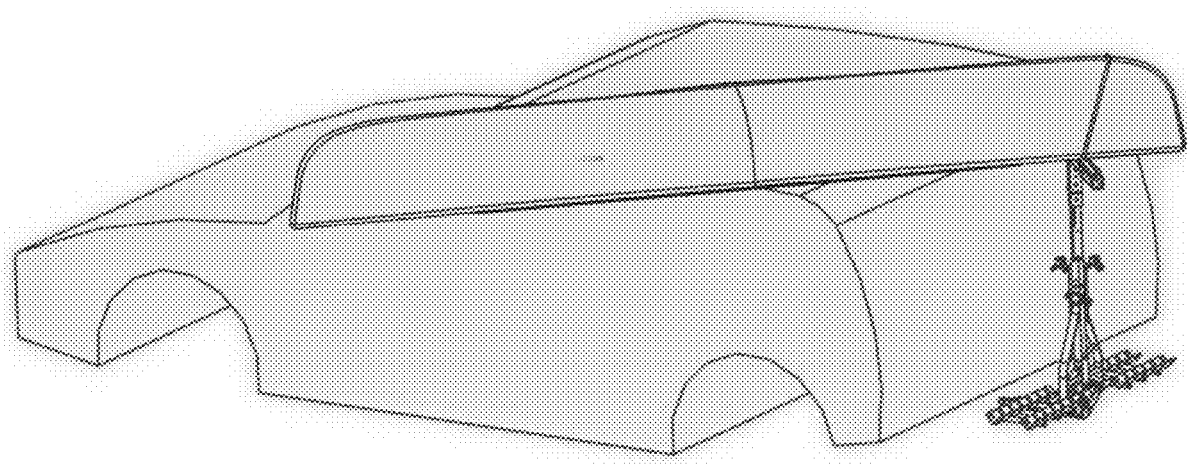
FIGS. 7-9 depict the device of the present invention with the upper portion of the device in various stages of articulation for allowing easier loading access of cargo to or from the vehicle roof.
Figure 8:
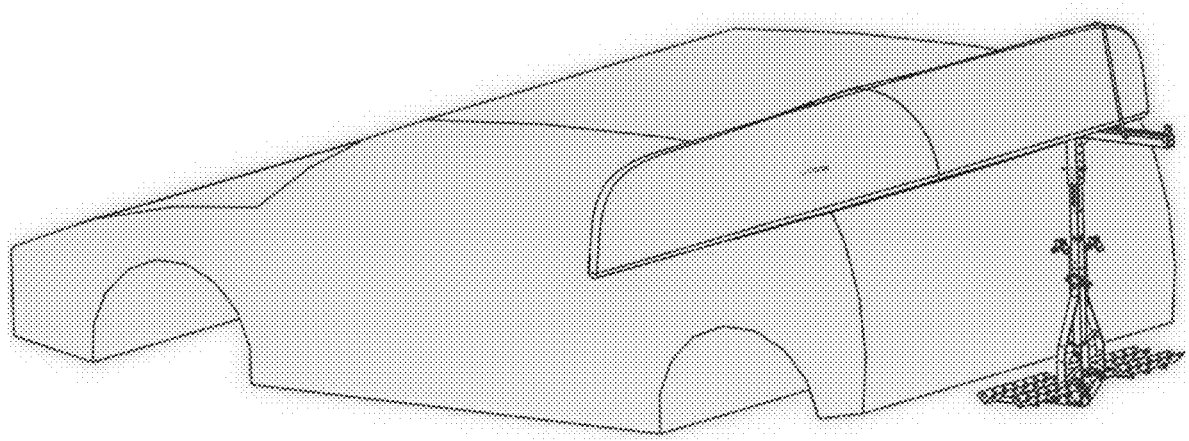
Figure 9:
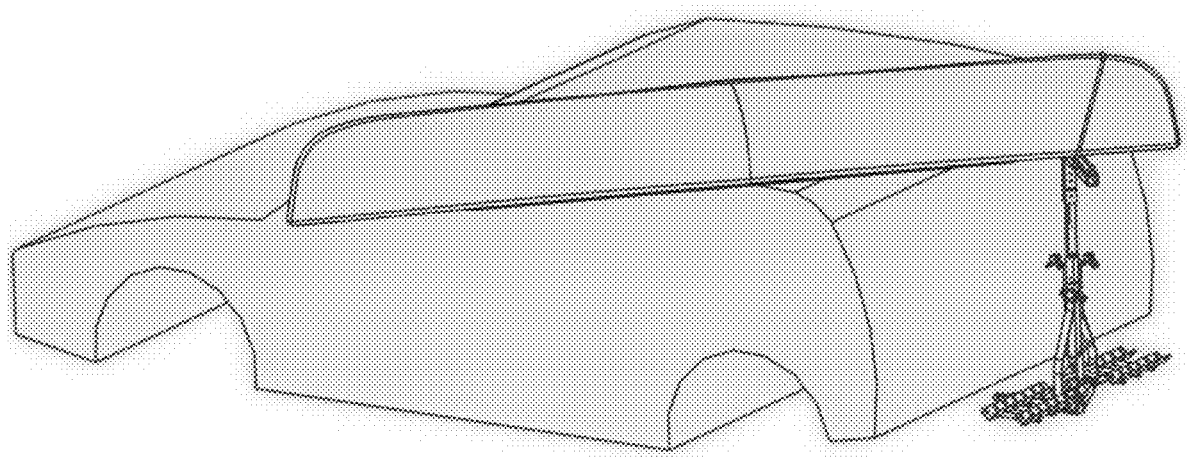

FIG. 4 depicts an expanded view of the photograph of FIG. 3, expanded to show points of articulation. Pinning 410 allows for upper horizontal beam 310 and a portion of vertical beam 220 to articulate rotationally so as to allow ease of removal or placement of roof cargo. Upper horizontal beam 310 is preferably formed of aluminum or comparable material and is preferably square in cross section. The combined pinning of pins 410 and pinning arrangement 420 allows for the portion above both to angle downwardly and to rotate. Pinning arrangement 420 allows the entire assembly to angle out and/or up to provide access to the interior of the vehicle through the rear hatch. Any or all of the elements of the present invention may additionally include protective padding and/or sound-deadening material.

In other embodiments, the device can further include a roof rack to further attach to the vehicle. As shown in FIG. 1, the device carries the back end of a connected canoe 110 and the forward end of the canoe itself as shown is additionally attached to a roof rack 150 (which may but is not necessarily a part of the present device) and the combination of the canoe with the roof rack and device of the present invention provides adequate structural support to keep both the canoe and the bicycles "locked" onto the racks and neither the bicycles nor the canoe and/or other cargo will move off the racks during driving.

FIG. 2 shows how lower base beam 290 connects with hitch 260. In general, among potentially other connecting devices, lower base beam 290 inserts within a portion of hitch 260 and its connecting assembly.

In the preferred embodiment, the vehicle used is one with a nearly vertical backside, such as but not limited to an SUV 130 or minivan. The device of the present invention can attach to other vehicles, such as sedans or pickup trucks as well. The function of this combined bike and cargo carry device however is particularly useful for cars, minivans that might not otherwise easily carry large objects like canoes or construction materials as is typical for a larger less fuel efficient pickup truck.

FIG. 2 shows an expanded view of two bicycles attached to the device of the present invention, which is attached to a vehicle's hitch.

Figure 10:
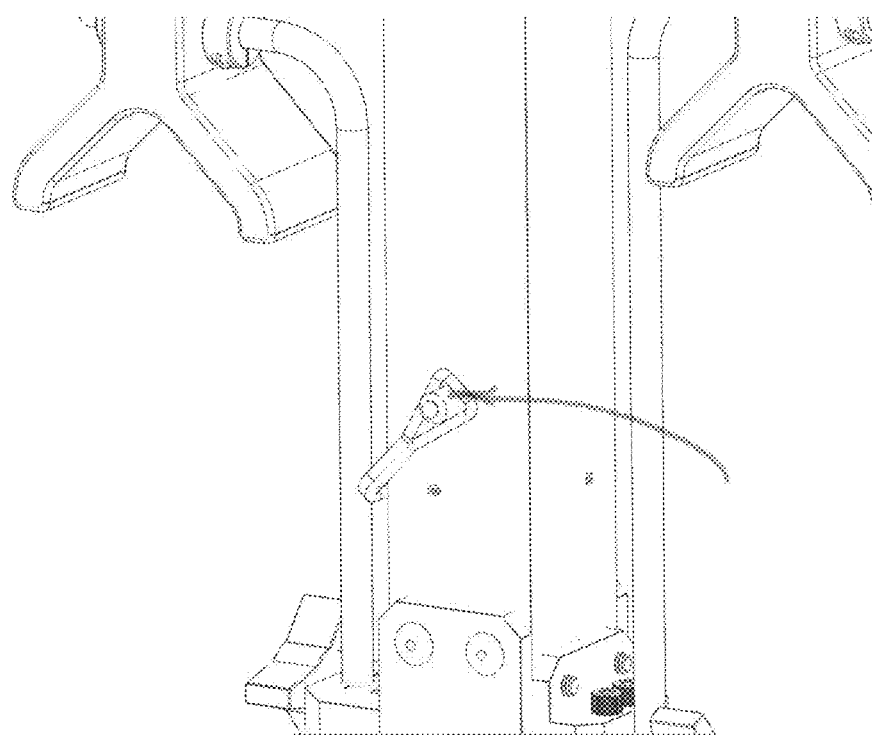
FIG. 10 depicts the locking mechanism for the articulating element.
Figure 11:
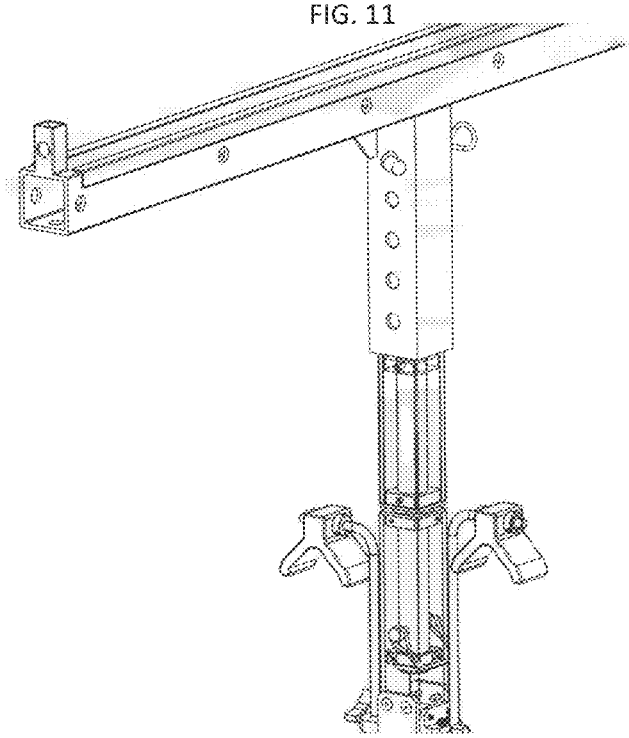
FIGS. 11-15 depict additional detail regarding the vertical beam of the present invention and elements attached to it.

FIG. 10 depicts locking mechanism 990 for an articulating element.

Additional figures are providing showing various assemblies and sub-assemblies, in use and otherwise.

Importantly, although described herein as bicycles generally riding behind the vehicle, bicycles and also or alternatively ride as cargo does on the roof.

As shown in FIGS. 23-26, to compensate for occasional hitch installation errors that result in angled down hitches, part of this invention is a novel hitch angle converter device that corrects the angle back to parallel to the ground. With hitch angle errors corrected, it is then possible to install add on devices to the main portion of the present invention that extend much further in the rearward direction. One example application of this would be three, four, or six wheel racks for carrying one or two adult tricycles of various sizes and weights.

Other fixed angle or adjustable angle embodiments are possible using routine design methods.

Figure 27:
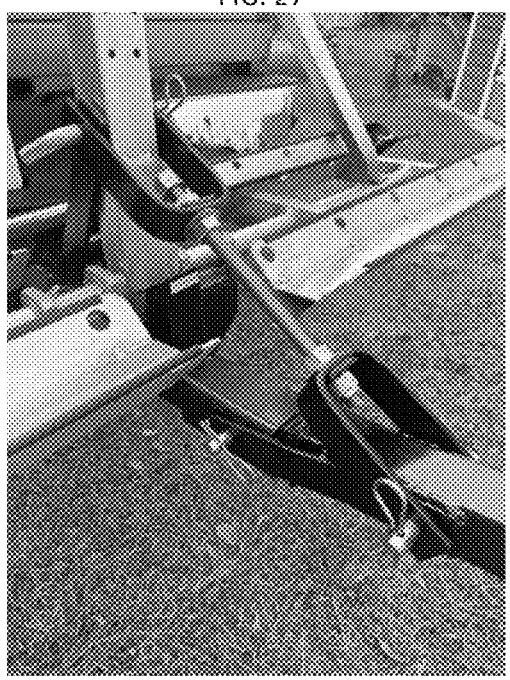
FIGS. 27-29 depict utility of extendable loading poles for the application of enabling easier load of two tandem bikes onto the vehicle's roof.
Figure 28:
Figure 29:
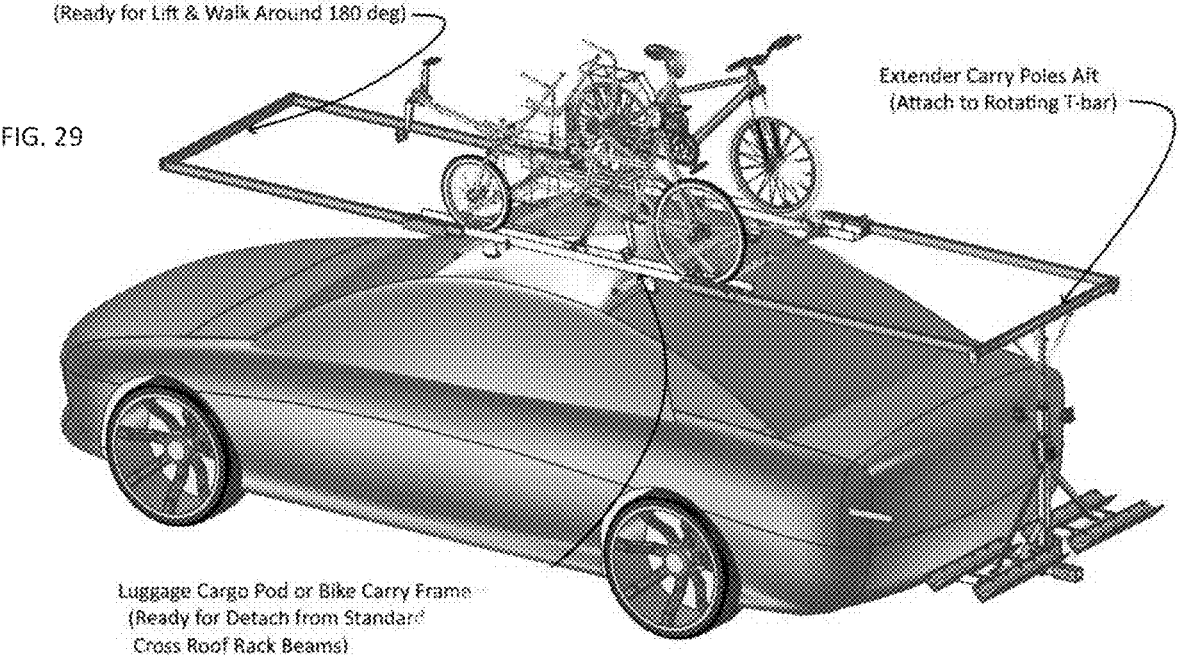

As shown in FIGS. 27-29, an extension of the utility of the present invention is enabled by the additional feature of extendable loading poles that deploy by sliding forward or aft, potentially on rails, from a roof top rack structure, such as typically used for luggage or bicycles. These extendable loading poles allow small yet heavy luggage pods to be more easily loaded using the main invention. The aft poles with their cross connector beam connect the roof mounted luggage pod or bike rack to the main portion of the invention. The forward poles are configured to slide forwards so it becomes easy for a person to lift them up in front of the vehicle and walk and rotate the object being placed around the axis of the main vertical beam and then to the ground. In this way, heavy sets of bicycles such as but not limited to two tandem bikes or a tandem with a regular bike, or a cargo box can more easily be loaded off or onto the vehicle's roof.

The bikes can be loaded at a much easier height while the rack is tilted down to the ground to the rear of the vehicle. Once loaded the main portion of the inventions' rotating T-bar acts like an extra person holding up one end while the other end is carried around 180 degrees to the front of the vehicle for simple drop down into place and attachment onto standard roof racks.

Figure 30:
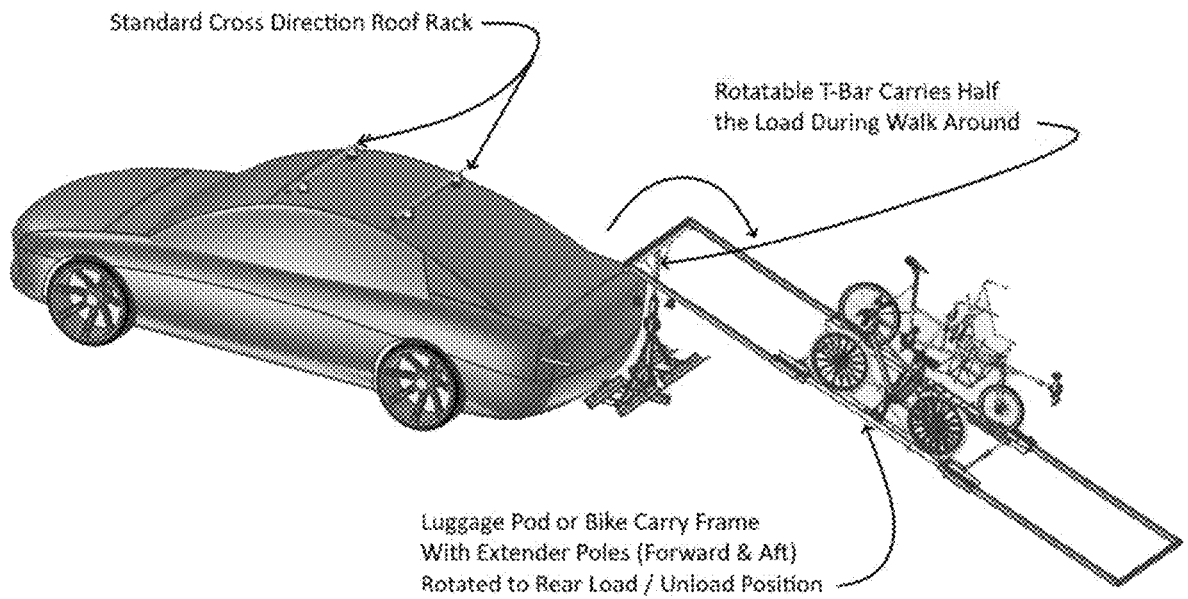
FIGS. 30-31 depict a hitch mounted rotating T-bar implementation without any bike carry provisions that can be easily installed or removed due to its "take apart pin" that allows module separation for less weight during install.
Figure 31:
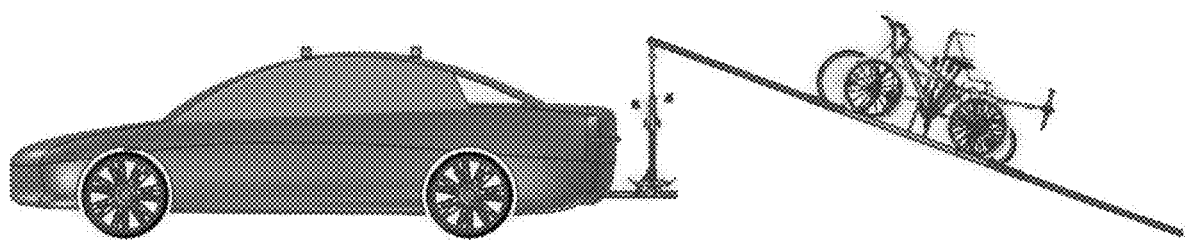
Figure 32:
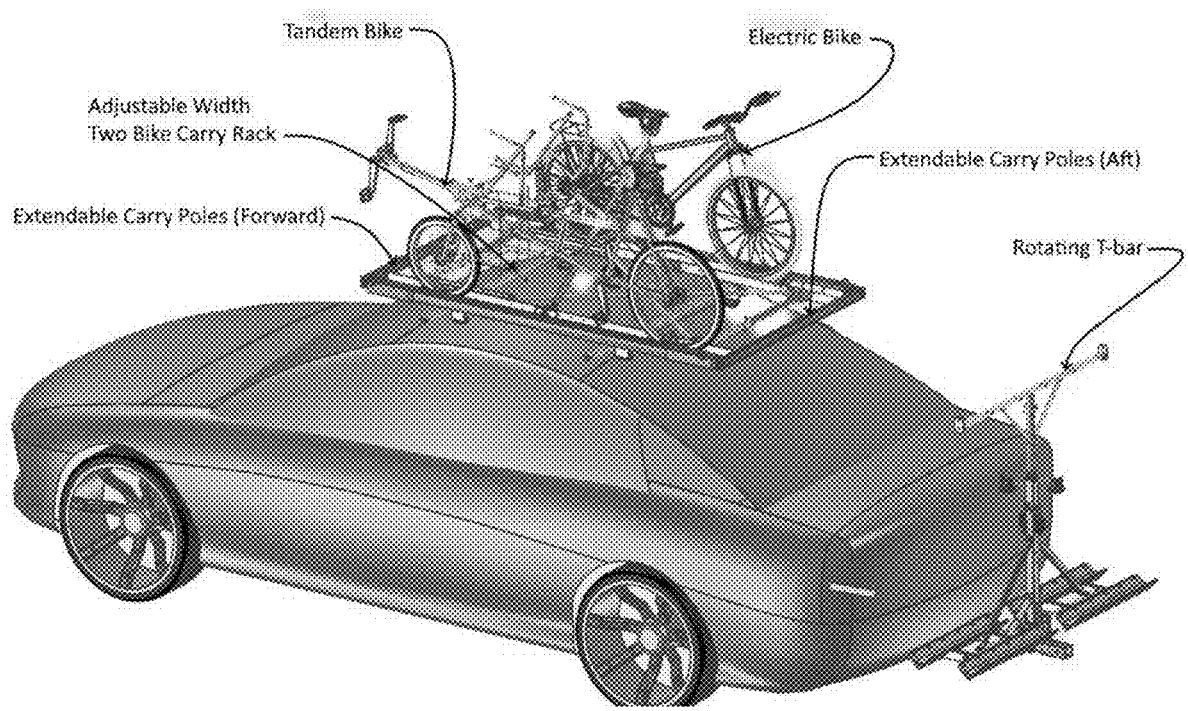
FIGS. 32-40 show a combination of photographs and computer generated images depicting the present invention in use.
Figure 33:
Figure 34:
Figure 35:
Figure 36:
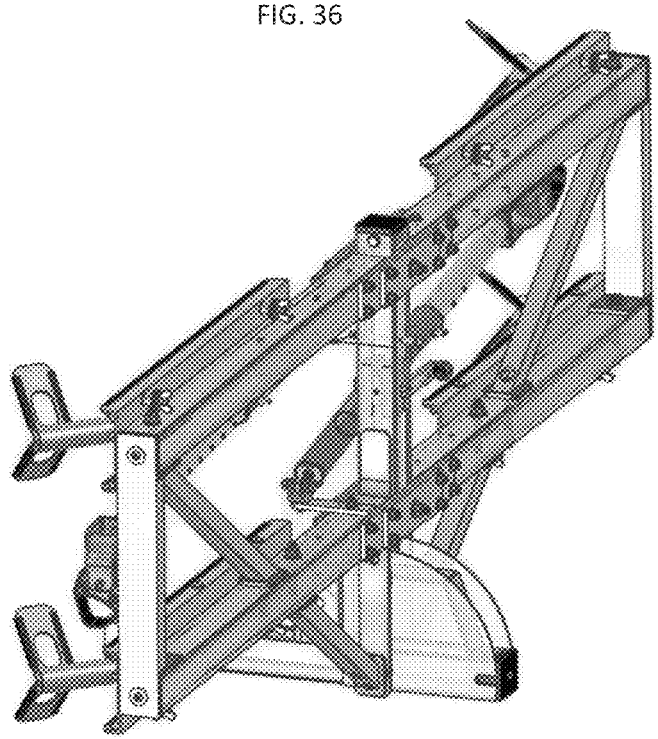
Figure 37:
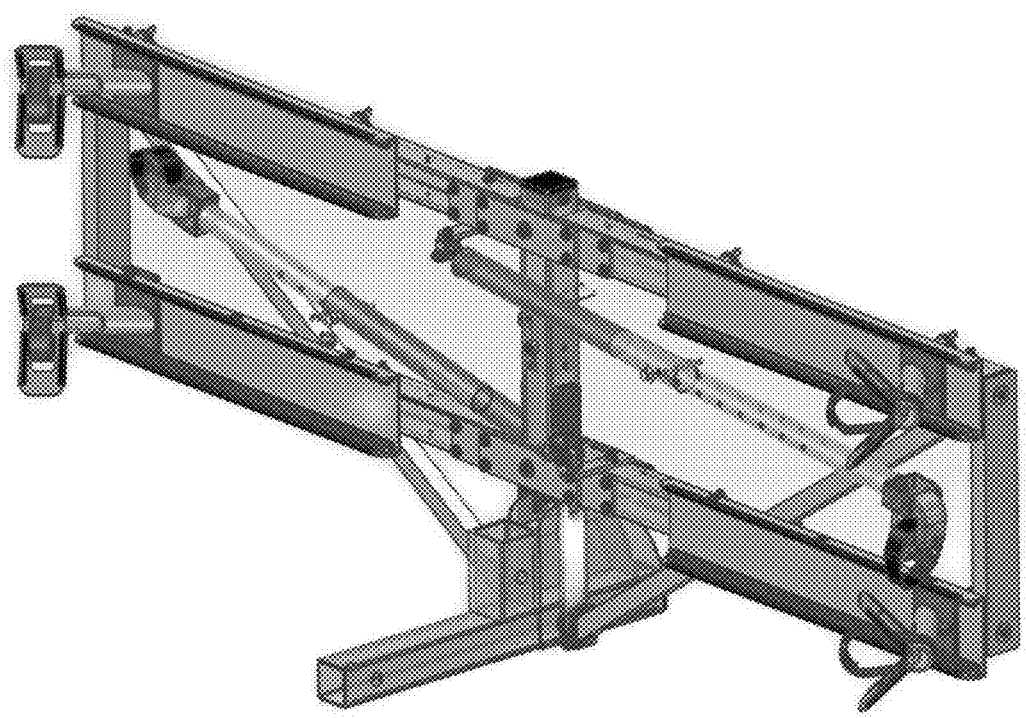
Figure 38:
Figure 39:
Figure 40:
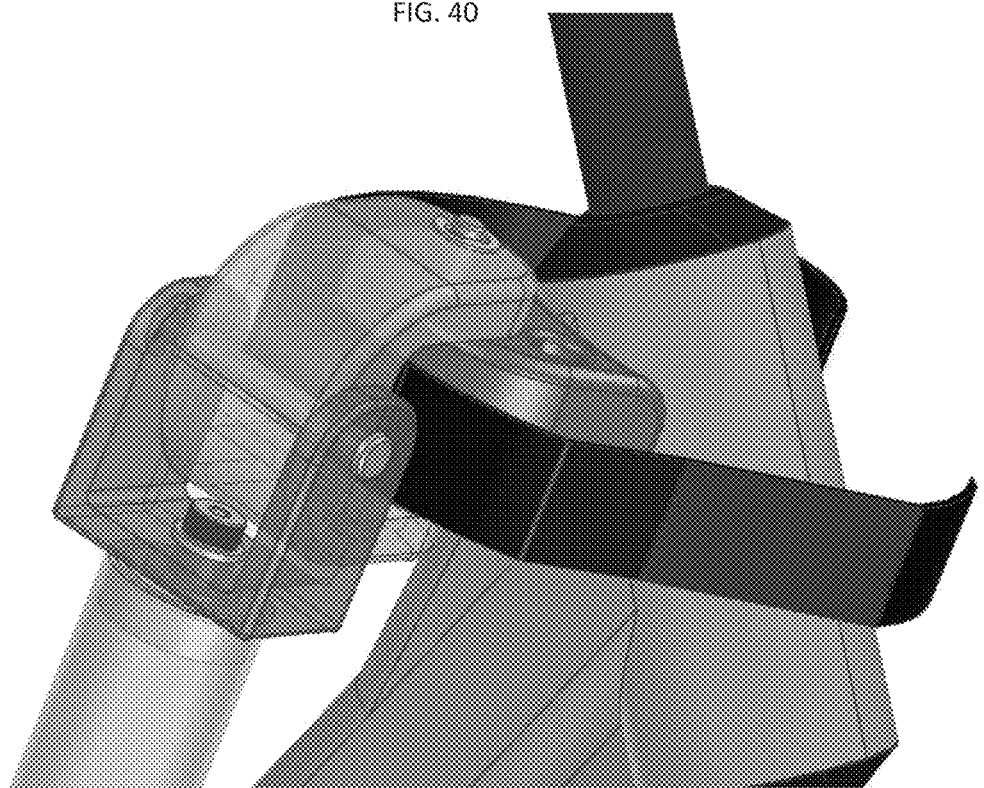

As shown in FIGS. 30-31, a feature of this invention is based on its rotating T-bar. A variety of foldup bike racks, hanger bike racks, and other style racks can have this feature built in and also the feature can exist on its own.

FIGS. 32-40 show a combination of photographs and computer generated images depicting the present invention in use.

The invention claimed is:

1. A hitch-mountable bicycle rack comprising:
a vertical beam configured to attach to a hitch on a vehicle;
an upper and a lower horizontal beam, each of said horizontal beams attached to opposing ends of said vertical beam at their lengthwise centers; and
a plurality of frame elements attached to said lower horizontal beam each configured for securing at least one bicycle tire;
wherein said upper horizontal beam and at least a portion of said vertical beam are configured to articulate together around a major axis of said lower horizontal beam so as to allow access to the rear of the vehicle with at least one mounted bicycle and said upper horizontal beam is configurable to rotate while remaining horizontal.

2. The rack of claim 1, wherein said rack is configured to be secured so as to prevent unwanted articulation or rotation.

3. The rack of claim 1, wherein bicycles mount vertically.

4. The rack of claim 3, where bicycles can optionally be maintained in a vertical configuration during articulation and rotation.

5. The rack of claim 1, further including clamping for locking bike frames on said rack.

6. The rack of claim 1, wherein a height of said vertical beam is adjustable.

7. The rack of claim 1, wherein said rack is extendible so as to carry more than two bicycles.

8. The rack of claim 1, wherein said frame elements are adjustable for carrying devices with more than two wheels.

9. The rack of claim 1, further including a cargo rack attachable to said upper horizontal beam, and in which said cargo rack includes beams which articulate in concert with rotation of said upper horizontal beam.

10. The rack of claim 9, wherein said cargo rack is configurable to carry bicycles on a vehicle's roof.

11. The rack of claim 9, wherein said cargo rack includes extendible rails for permitting ease of cargo placement.

12. The rack of claim 11, wherein said upper horizontal beam rotates at least 180 degrees to ease placement of cargo.

13. The rack of claim 9, wherein the width of said cargo rack is adjustable.

14. The rack of claim 1, further including an angle converter attachable to a hitch extender for adjusting the angular configuration of the attachment to the hitch.

15. The rack of claim 1 wherein said frame elements are configured as troughs.

\* \* \* \* \*